United States Patent
Davis

(10) Patent No.: US 11,057,426 B2
(45) Date of Patent: Jul. 6, 2021

(54) METHODS AND SYSTEMS PROVIDING CYBER DEFENSE FOR ELECTRONIC IDENTIFICATION, VEHICLES, ANCILLARY VEHICLE PLATFORMS AND TELEMATICS PLATFORMS

(71) Applicant: Donnell A Davis, Bowie, MD (US)

(72) Inventor: Donnell A Davis, Bowie, MD (US)

( * ) Notice: Subject to any disclaimer, the term of this patent is extended or adjusted under 35 U.S.C. 154(b) by 0 days.

(21) Appl. No.: 17/012,854

(22) Filed: Sep. 4, 2020

(65) Prior Publication Data

US 2021/0075825 A1 Mar. 11, 2021

Related U.S. Application Data

(60) Provisional application No. 62/896,559, filed on Sep. 5, 2019, provisional application No. 62/896,569, filed on Sep. 5, 2019.

(51) Int. Cl.
*H04L 29/06* (2006.01)

(52) U.S. Cl.
CPC .......... *H04L 63/1466* (2013.01); *H04L 63/08* (2013.01); *H04L 63/1416* (2013.01)

(58) Field of Classification Search
CPC .. H04L 63/08; H04L 63/1416; H04L 63/1466
(Continued)

(56) References Cited

U.S. PATENT DOCUMENTS

2019/0179306 A1* 6/2019 Mckinney ............ G08G 5/0056
2020/0292375 A1* 9/2020 Murray .................. G01G 19/08

OTHER PUBLICATIONS

Digital License Plates Roll Out in California https://www.npr.org/sections/thetwo-way/2018/06/01/616043976/digital-license-plates-roll-out-in-california James Doubek Jun. 1, 2018 (Year: 2018).*

(Continued)

*Primary Examiner* — Kambiz Zand
*Assistant Examiner* — Benjamin A Kaplan
(74) *Attorney, Agent, or Firm* — McLean Law LLC; Kimberly McLean, esq

(57) ABSTRACT

A system and method for providing cyber defense for electronic identification, vehicles, ancillary vehicle platforms, and telematics platforms using blockchain. The vehicle may be a ground-based vehicle, air-based vehicle, roadable aircraft vehicle, sea-based vehicle, autonomous vehicle, or unmanned aerial vehicle. Wherein ancillary vehicle platforms may include, but not limited to, aviation platforms, urban air mobility platforms (UAM), and unmanned aircraft systems (UAS). The system and method include determining whether a user is an authorized operator of a vehicle, the vehicle including an external display of a digital license tag. If the user is determined to be an unauthorized operator of the vehicle, the system activates a primary kill switch which prevents the activation of the vehicle's digital license tag. If the user is determined to be an authorized operator of the vehicle, the system activates the vehicle's digital license tag and initiates continuous cyber security monitoring of the vehicle while the vehicle is activated. The system obtains data from an Identity and Access Management Enterprise ("IAME") platform, ancillary vehicle platforms and vehicle telematics platforms during operation of the vehicle until a cyber-attack is detected during the cyber security monitoring. The system activates a secondary kill switch when a cyber-attack is detected. The secondary kill switch disables operation of the vehicle.

20 Claims, 6 Drawing Sheets

(58) Field of Classification Search
USPC .......................................................... 726/6
See application file for complete search history.

(56) References Cited

OTHER PUBLICATIONS

Digital License Plates Have Arrived Joe D'Allegro Mar. 1, 2018 (Year: 2018).*

* cited by examiner

United States Patent US 11,057,426 B2

METHODS AND SYSTEMS PROVIDING CYBER DEFENSE FOR ELECTRONIC IDENTIFICATION, VEHICLES, ANCILLARY VEHICLE PLATFORMS AND TELEMATICS PLATFORMS

CROSS-REFERENCE TO RELATED APPLICATIONS

This application claims the benefit of priority of U.S. Provisional Application No. 62/896,559 filed on Sep. 5, 2019 and U.S. Provisional Application 62/896,569 filed on Sep. 5, 2019, the disclosures of which are both incorporated herein by reference in its entirety.

FIELD OF THE INVENTION

Embodiments described herein generally relate to cyber defense, and more particularly to cyber defense for electronic identification, vehicles, ancillary vehicle platforms and telematics platforms.

BACKGROUND OF THE INVENTION

The use of digital license plates provides a digital medium and interoperability framework that can make vehicle management, such as, vehicle fleet management, vehicle operation management, administered vehicle registration (state, federal, or military), and external remote vehicle identification more efficient. Wherein the digital license tag meets the configuration requirements per the American Association of Motor Vehicle Administrators (AAMVA), federal motor vehicle identification regulations (40 U.S. Code § 609, FMR 102-34.85-105, FMR 102-34.110-150), the International Civil Aviation Organization (ICAO) format for unique manufacturer serial numbers, or the American National Standards Institute (ANSI/CTA-2063-A) format for "Remote Identification of Unmanned Aircraft Systems." Vehicle management is an important task for individuals and organizations that maintain and operate vehicles as recreational, or part of their business fleet management. Many fleet services are designed to minimize vehicle investment risks, reduce thefts and losses, reduce transportation and staff costs, improve transport efficiency, and increase productivity, and particularly enhance security services and telematics services. These services play a vital role in vehicle fleet management and both services can be improved with the use of digital license plates.

Moreover, vehicle operations such as unauthorized vehicle use, vehicle driver insurance compliance, vehicle tracking, vehicle tolling, and compliance with state, federal, or military mandates may be easily facilitated with the digital license plate. Likewise, instead of having to visit a state, federal, or military motor vehicle or transportation department and waiting for registration stickers to be sent in the mail, or relying on manual formats or processes governing unique manufacturer serial numbers for remote identification of unmanned aircraft systems, vehicle registration can be automatically renewed online with a digital license plate, thereby providing a more efficient solution for vehicle registration.

Recent trends are highlighting vulnerabilities in autonomous vehicles, but specifically within aviation platforms, urban air mobility platforms (UAM), and unmanned aircraft systems (UAS). For example, the United States Federal Aviation Administration (FAA), Department of Transportation (DOT) requires the remote identification of unmanned aircraft systems. The remote identification of unmanned aircraft systems in the airspace of the United States would address safety, national security, and law enforcement concerns regarding the further integration of these aircraft into the airspace of the United States while also enabling greater operational capabilities. The FAA also filed a ruling mandating that device owner's show external mini-license plates for all unmanned aerial vehicles (UAV) operating in the United States. Specifically, manufacturers in the United States must ensure that each UAV produced has a visible external serial number that complies with the American National Standards Institute (ANSI/CTA-2063-A) serial number standard for "Remote Identification of Unmanned Aircraft Systems."

The digital license plate is an interoperability framework that aligns with many global electronic identification (eID) initiatives such as the United States "Real ID Act", the "Fast Identity Online (FIDO) Alliance", the South Korean "Initial Decentralized Identifiers (DID) Association", and the European Commission "Electronic Identification, Authentication and Trust Service" (eIDAS) regulation. For example, the European Commission has obliged all European Union (EU) Member States operating an electronic identification scheme to create a common electronic identification framework that recognizes eIDs from other EU Member States to ensure its authenticity and security. The goal being an interoperable identification and authentication framework that allow EU citizens to access online services across borders within the EU.

While the digital license plate provides many advantages to vehicle management, the digital license plate is a digital medium, which means it can be susceptible to cyber-attacks. In fact, as more vehicles are increasingly incorporating in-vehicle computer systems to help with everything from safety to navigation, cyber-security is a top priority in vehicle management and enhanced vehicle security features are desirable. Blockchain technology can be used to provide enhanced vehicle security features such as remote identification and preventing unauthorized use of the vehicle by performing blockchain identity management.

Blockchain is a system that maintains a record of transactions across several linked computers. It functions as a database that contains both individual and group transactions. A number of transactions make up a block and blocks are grouped in protected systems with an identification code that connects each transaction to the one preceding and the one following. The chains of blocks protect against fraud. The chain cannot be broken in an attempt to either remove or replace code without the permission of all participants in the chain. Hence an immutable registry of vehicles and authorized users can be maintained with blockchain technology.

BRIEF DESCRIPTION OF THE DRAWINGS

The various advantages of the embodiments of the present disclosure will become apparent to one skilled in the art by reading the following specification and appended claims, and by referencing the following drawing(s), in which:

SUMMARY OF THE INVENTION

Figure 1:
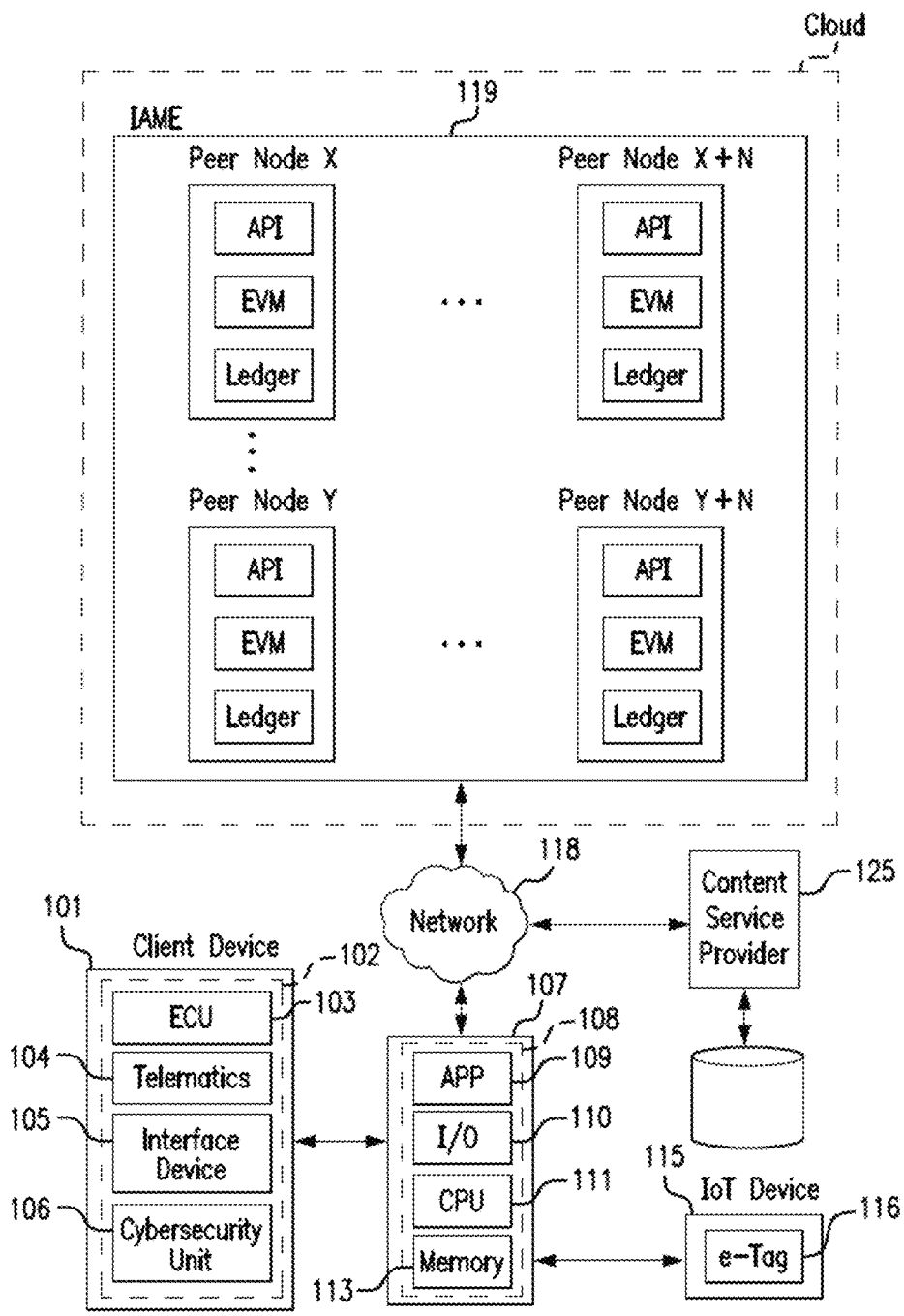
FIG. 1 depicts an illustrative architecture in which techniques and structures for providing the systems and methods disclosed herein may be implemented.

Exemplary embodiments disclosed herein describe a computer implemented method of providing cyber defense for electronic identification, vehicles, and telematics platforms. The method comprising the steps of: determining whether a user is an authorized operator of a vehicle; activating a primary kill switch if the user is determined to be an unauthorized operator of the vehicle, wherein the primary kill switch prevents activation of the vehicle or of vehicle's digital license tag; activating the vehicle or the vehicle's digital license tag and activating cyber security monitoring if the user is determined to be an authorized operator for the vehicle; activating vehicle telematics if no cyber-attack is detected by the cyber security monitoring; continuously performing cyber security monitoring as long as the vehicle is in an active state; activating a secondary kill switch if the cyber security monitoring detects a cyber-attack; and activating cyber threat quarantine procedures and cyber threat detection notifications after activation of the secondary kill switch.

In some exemplary embodiments, the method further includes the step of extracting data corresponding to the activated telematics from a blockchain network for display on a first dashboard.

In some exemplary embodiments, the method further includes the step of displaying data corresponding to the cyber security monitoring on a second dashboard.

In some exemplary embodiments, the step of determining whether a user is an authorized operator of the vehicle includes performing an identity verification protocol.

In some exemplary embodiments, the identity verification protocol includes authorizing the user, authenticating the user and actualizing the digital license tag.

In some exemplary embodiments, authorizing the user includes assigning a unique identifier, serial number, registration number, or session ID to the user with remote identification broadcast and transmit capabilities.

In some exemplary embodiments, authenticating the user includes performing at least two or more processes from the group comprising password authentication, fingerprint authentication, facial authentication, security token authentication and mobile device authentication.

In some exemplary embodiments, actualization of the user includes triggering the activation of the digital license tag when the user is determined to be an authorized operator of the vehicle and triggering the primary kill switch when the user is determined to be an unauthorized operator of the vehicle.

In some exemplary embodiments, the activated vehicle telematics allow tracking of the vehicle.

In some exemplary embodiments, the vehicle telematics provides data for one or more metrics from the group comprising i) vehicle speed, ii) vehicle position with a Coordinated Universal Time (UTC), global positioning system (GPS) or GPS alternative such as magnetic sensors (magnetometers) time mark, iii) vehicle direction, iv) vehicle altitude and vehicle operator control station location regarding autonomous vehicles, air-based vehicles, roadable aircraft vehicles, and unmanned aerial vehicles (UAV).

In some exemplary embodiments, on-blockchain processes are used to perform the identity verification protocol.

In some exemplary embodiments, on-blockchain processes and off-blockchain processes are used to perform an identity verification protocol.

In some exemplary embodiments, a cyber-attack is detected upon hacking detection of the vehicle's on-board systems.

Other exemplary embodiments disclosed herein describe a system for providing cyber defense for electronic identification, vehicles, ancillary vehicle platforms, and telematics platforms. The system includes at least one mobile device comprising a client interface unit for interfacing with at least one client device including a vehicle engine control unit (ECU); an on-board diagnostics (OBD II) port; a telematics control unit (TCU); a cybersecurity unit; an internet of things (IoT) unit for interfacing with an IoT device including a digital license tag which is associated with a vehicle; at least one processor; at least one memory for storing executable instructions, the at least one processor configured to execute the instructions to: generate blockchain transactions to send to a user identity platform enterprise to retrieve user information relating to the vehicle; determine whether a user is an authorized operator of the vehicle using the retrieved user information; activating a primary kill switch if the user is determined to be an unauthorized operator of the vehicle, wherein the primary kill switch prevents the activation of the vehicle or of the digital license tag associated with the vehicle; activating the vehicle or the digital license tag associated with the vehicle and activating cyber security monitoring if the user is determined to be an authorized operator of the vehicle; activating vehicle telematics if no cyber-attack is detected by the cyber security monitoring; continuously performing cyber security monitoring as long as the vehicle is in an active state; activating a secondary kill switch if the cyber security monitoring detects a cyber-attack; and activating cyber threat quarantine procedures and cyber threat detection notifications after activation of the secondary kill switch.

Further, the system includes a network engine, an Identity and Access Management Enterprise ("IAME"); at least one content service provider network enterprise. The IAME including a memory for storing executable instructions; a distributed network of peer to peer computing devices, wherein each computing device includes a decentralized ledger for storing transactions and smart contracts, and at least one hardware microprocessor configured to execute the instructions to: process the generated blockchain transactions received from the at least one mobile device; query the decentralized ledger to retrieve user information; and transmit the user information to the at least one mobile device.

In some exemplary embodiments, the determination of whether a user is an authorized operator of the vehicle includes performing an identity verification protocol.

In some exemplary embodiments, the identity verification includes authorizing the user, authenticating the user and actualizing the digital license tag.

In some exemplary embodiments, authorizing the user includes assigning a unique identifier, serial number, registration number, or session ID to the user with remote identification broadcast and transmit capabilities.

In some exemplary embodiments, authenticating the user includes performing at least two or more processes from the group comprising password authentication, fingerprint authentication, facial authentication, security token authentication and mobile device authentication.

In some exemplary embodiments, actualization of the user includes triggering the activation of the digital license tag when the user is determined to be an authorized operator of the vehicle and triggering the primary kill switch when the user is determined to be an unauthorized operator of the vehicle.

DETAILED DESCRIPTION

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents.

The present disclosure relates to a system and method for providing cyber defense for electronic identification, vehicles, ancillary vehicle platforms and telematics platforms, which will dramatically enhance physical security of fleet vehicles. The vehicles may include, but are not limited to, manned vehicles, such as, for example, ground-based vehicles (e.g., an automobile), air-based vehicles (e.g., an aircraft), sea-based vehicles (e.g., a ship), roadable aircraft vehicles (e.g., a multimodal vehicle such as flying automobile), and unmanned vehicles, such as, for example, autonomous vehicles (e.g., an automobile), or unmanned aerial vehicles (UAV)(e.g., a drone). Further, the ancillary vehicle platforms may include, but are not limited to, aviation platforms, urban air mobility platforms (UAM), and unmanned aircraft systems (UAS). While various exemplary embodiments described herein are directed to a ground-based manned vehicle (e.g., an automobile), the system 100 may be used with any vehicle and/or any ancillary vehicle platform system as defined herein.

The systems and methods incorporate an innovative identity verification protocol using blockchain technology to assure that only authorized personnel can start and operate fleet vehicles. Furthermore, the system and methods include enhanced telematics features which provide entities with the tools they need to better manage their fleets. The system and method of the present disclosure can be integrated into a vehicle during the manufacturing process or aftermarket.

As illustrated in FIG. 1, an exemplary embodiment of a system for providing cyber defense for electronic identification, vehicles, ancillary vehicle platforms ("the system") 100 includes a at least one client device 101, at least one user network device 107, at least one Internet of Things (IoT) device 115, a network engine 118 (i.e., wide area network), at least one Identity and Access Management Enterprise ("IAME") 119, and at least one content service provider 125. In other embodiments, the system 100 may include a plurality of client devices 101, user network devices 107, IoT devices 115, IAMEs 119, and content service providers 125.

The at least one client device ("the client device") 101 may be integrated within any vehicle (i.e., manned vehicles) and/or any vehicle ancillary platform (i.e., unmanned vehicles). So, for example, one or more parts of the at least one client device may be integrated in the vehicle and one or more other parts may be integrated in the vehicle ancillary platform. Alternatively, all of the parts may be integrated in the vehicle. The client device may include a computer (e.g., automotive computer 102) that may be installed in an engine compartment of a vehicle (or elsewhere in the vehicle) as part of system 100 in accordance with the disclosure. The computer may include at least one engine control unit (ECU) 103, at least one telematics device ("the telematics device") 104, at least one interface device ("the interface device") 105 and at least one cybersecurity unit ("the cybersecurity unit") 106.

The ECU 103 provides a control function to the vehicle's electrical system or subsystems through digital computing hardware and associated software. The ECU may include at least one microprocessor that receives, interprets and reacts to sensor inputs. Moreover, the ECU may include at least one memory storing executable instructions for processing by the at least one microprocessor. The ECU 103 may include other hardware encoded with software, such as, for example, proprietary hardware including sensors or actuators. The ECU monitors a plurality of sensors embedded within the vehicle to ensure conditions are within normal operating range. When there's a problem, the ECU stores a trouble/status code and triggers the check engine light so that the problem can be diagnosed by an appropriate party (e.g., a mechanic). The ECU prevents the engine from turning on for airborne-based vehicles and sea-based vehicles in response to receiving a primary skill switch. The ECU shuts down the engine of ground-based vehicles and sea-based vehicles in response to receiving a secondary kill switch. The ECU forces an airborne-based vehicle to land in response to receiving a secondary kill switch.

The telematics device 104, upon activation by the user network device 107, collects information for fleet management, such as, for example, diagnostics data (e.g., fault codes), real-time location, vehicle position with Coordinated Universal Time (UTC), global positioning system (GPS) or magnetometer time mark, vehicle direction, miles traveled, number of stops, vehicle altitude, vehicle operator control station location regarding autonomous vehicles, air-based vehicles, roadable aircraft vehicles, and unmanned aerial vehicles (UAV), vehicle speed and other parameters of the vehicle (through different interfaces) and sends the information to user network device 107. The telematics device 104 is deactivated upon receipt of a deactivation signal from the user network device 107.

The telematics device 104 may be installed in a vehicle's on-board diagnostics interface unit, such as, for example, an automobile on-board diagnostics port (OBD II Port). The telematics device obtains data from the on-board diagnostics interface unit. Alternatively, the telematics device 104 may be built into any structure of the vehicle.

Some examples of the telematics device 104 can include, for example, an infotainment system mounted on a dashboard of the vehicle, a radio communications device mounted in the vehicle, a personal device such as a smartphone carried by the driver/operator of a vehicle or another occupant of the vehicle, a computer installed in the vehicle, and a portable computing device such as a tablet computer.

The data obtained from the on-board diagnostics interface unit (e.g., OBD II port) may include vehicle speed, RPM, and fuel level. The data may be uploaded to a software interface (e.g., a software interface to user network device 107) for further processing. Using the obtained data, the telematics device 104 is able to monitor the vehicle's idling times, speeding, over-revving, trip start and finish, excessive idling, fuel consumption, etc. By monitoring the on-board diagnostics interface unit's data, an organization may know if one of its vehicles has an engine problem and by interpreting the diagnostic code(s) the nature of the problem.

The telematics device 104 includes a control unit (TCU), which is the central hardware module of the telematics device and has communication interfaces with the ECU 103, user network device 107, and IAME 119. The TCU may include a global positioning system (GPS) or magnetometer module for tracking information associated with the latitude and longitude of the vehicle, a central processing unit (CPU) with memory management and data processing capabilities. The central processing unit may include one or more microcontrollers, microprocessors, application specific processors, field programming gate array (FPGA) for managing multiple processes occurring within the TCU. The memory may store executable instructions for processing by the central processing unit.

Moreover, the TCU may include communication interfaces, a General Packet Radio Services (GPRS) module, a Bluetooth module, an input/output interface, user interface device and various other hardware and software modules. The communication interfaces support a wide range of communication including Wi-Fi, cellular, LTE etc. The GPRS module provides data connectivity with remote devices using a mobile data standard for a cellular communication network. The Bluetooth module connect nearby devices with the telematics device. The input/output interface system connects to lights, buttons, and other analog and digital I/O type interfaces. The user interface device 107 may showcase crucial information such as navigation maps, vehicle speed, fuel usage etc.

The at least one interface device 105 is embedded with logic and code for interfacing with the system architecture of the vehicle. So, for example, the at least one interface device may interface with the vehicle's on-board system(s). Each vehicle may include on-board system(s) that maintain diagnostic codes which relate to operational aspects of the vehicle. For example, the diagnostic codes may include a ECU/CAN (controller area network) status code, which may provide an indication as to whether the application 109 in the user network device 107 is connected to and synced with the at least one interface device 105 (e.g., mobile device cradle/OBD II port) which provides access to the ECU via the CAN. Any attempt to access the ECU/CAN by an un-synced application will result in an abnormality status code.

Moreover, the at least one interface device 105 is embedded with logic and code for interfacing with user network device 107. The at least one interface device may provide the diagnostic codes to the user network device 107 for monitoring and processing by application 109.

Each vehicle has a vehicle operator operating the vehicle when the vehicle is turned on. The vehicle operator for manned vehicles is present in the vehicle. While the vehicle operator for unmanned vehicles is located remotely from the vehicle (e.g., at a vehicle ancillary platform location). For manned vehicles, the interface device 105 may include at least one mobile interface device (e.g., mobile device cradle/OBD II port). For unmanned vehicles, the interface device 105 may include at least one interface unit which interfaces with a vehicle ancillary platform (e.g., unmanned aircraft system).

For unmanned vehicles, a built-in vehicle wireless modem may be integrated within the vehicle for an Internet connection. The at least one interface device is embedded with logic and code to interface with the built-in vehicle wireless modem and with a corresponding vehicle ancillary platform. Every unmanned vehicle has a corresponding vehicle ancillary platform from where a vehicle operator manages the operation of the unmanned vehicle. Each vehicle operator who is granted access to the unmanned vehicle's built-in vehicle modem is provided with a Remote ID for a designated access location. The on-board system(s) may provide a diagnostic code relating to the status of the built-in vehicle wireless modem. So, for example, any access to the built-in vehicle wireless modem by anyone with an incorrect Remote ID and/or from anyone at a non-designated location will result in an abnormality status code.

The at least one cybersecurity unit 106 is embedded with logic and code for providing cyber notifications to a vehicle operator. The cyber notifications are provided immediately upon vehicle turn on of any vehicle that has a display screen. So, for example, when a vehicle operator turns on an automobile, a cyber notification may appear as a dashboard graphic on the automobile dashboard. The cyber notification will inform individuals, through an easy to understand, standardized graphic, about the extent to which the vehicle protects the cybersecurity and privacy of vehicle owners, lessees, drivers, and passengers.

The user network device 107 comprises one or more computing devices 108 that can receive input from a user (i.e., vehicle operator) and can transmit and receive data via one or more of the communication devices comprising the group of Bluetooth, near field communication, WIFI or network 118. For example, the user network device 107 may be a desktop computer, a laptop computer, a smart phone, a personal digital assistant (PDAs), a computer system at a vehicle ancillary platform, or any other device including computing functionality and data communication capabilities. In a preferred embodiment, the user network device is a portable smart mobile device. In another exemplary embodiment, the one or more computing devices may include cloud computing resources, such as, for example, a Blockchain as a Service (BaaS) platform.

The user network device 107 is configured to communicate with client device 101, IoT device 115, network engine 118, IAME 119, and the one or more one content providers 125 by way of any one or more of the communication devices, i.e., Bluetooth, near field communication, WIFI or network 118. The user network device 107 may support one or more user input devices such as, for example, a touchscreen, microphone, camera, physical keyboard and/or trackball and one or more output devices, such as a speaker.

The one or more computing devices 108 may each include a display, an input/output interface 110, one or more central processing units (CPU) or microprocessors 111, one or more memory devices 113, such as, for example, random access memory (RAM) and/or non-volatile secondary storage (e.g., flash memory, a hard drive, a floppy drive, and a CD-ROM drive), network interfaces (e.g., a wired or wireless Ethernet card), program code (i.e., computer executable instructions), such as, for example, application 109 program data and one or more biometric scanners (e.g., fingerprint scanner, facial scanner).

The user network device 107 may display content from client device 101, IoT device 115, IAME 119, the at least one content provider 125 and the user network device 107. Moreover, the user network device 107 may display one or more dashboard display views that include data accessed and extracted from on the blockchain (i.e., IAME) and off the blockchain. Alternatively, the one or more dashboards may be provided through cloud/web-based reporting tools. The one or more dashboards may provide key performance indicators and metrics for categories of information, such as, for example, asset management, vehicle operator identification management, operations management, vehicle diagnostics and analytics, risk management, motor pool management, and federal reporting.

The asset management dashboard(s) may include inventory data and interfaces, such as, for example, vehicle acquisitions, vehicle disposals, UNICOR license plate store interface, a Federal Motor Vehicle Registration System (FMVRS) interface, or a manufacturer serial numbers interface aligned with the American National Standards Institute (ANSI/CTA-2063-A) for "Remote Identification of Unmanned Aircraft Systems".

The vehicle operator identification management dashboard(s) may include identity, credential and compliance and data and interfaces, such as, for example, physical and logical access module, automated credential database interface, a Department of Motor Vehicles (DMV) interface, a Department of Transportation (DoT) interface, a driver's insurance compliance interface, or a Remote Identification of Unmanned Aircraft Systems interface.

The operations management dashboard(s) may include telematics—GPS/Magnetometer tracking data, such as, for example, speed, tracking (i.e., geofencing), time mark identifying a Coordinated Universal Time (UTC), global positioning system (GPS) or magnetometer time marking, idling, utilization, and mileage.

The vehicle diagnostics and analytics dashboard(s) may include telematics—vehicle diagnostics data, such as, for example, engine diagnostics, fuel usage reports and maintenance reports.

The risk management dashboard(s) may include telematics—safety management features, such as, for example, roadside assistance and collision notification, and public safety interactions, such as, law enforcement module, traffic violation module, and how's my driving module.

The motor pool management dashboard(s) may include a car-sharing module. The federal reporting dashboard(s) may include asset-level data interfaces, such as, for example, fleet management information system, federal automotive statistical tool, GSA fleet drive-thru and mileage express.

The input/output interface 110 may be configured to receive signals from various sources, such as, for example, any of the one or more user input devices in user network device 107, client device 101 (e.g., telematics data, engine diagnostics, etc.), IoT device 115 (e.g., sensor data), IAME 119 (e.g., digital asset data), content service provider 125 (e.g., off-blockchain identity data), and federal or statewide network enterprise (e.g., off-blockchain vehicle registration information).

Moreover, the input/output interface 110 may be configured to output signals to various sources such as, for example, the at least one client device 101 (e.g., secondary kill switch signal), the at least one IoT device 115 (e.g., primary kill switch signal), IAME 119 (e.g., identity data), the one or more content service providers 125 (e.g., request for off-blockchain user identity data, vehicle information).

The program code and program data may be loaded into a RAM from a non-volatile secondary storage (i.e., memory) and provided to the one or more microprocessors 111 for execution. The one or more microprocessors 111 can generate and store results in the one or more memory devices 113 for subsequent access, display, output and/or transmission to IAME 119. The program code (e.g., application 109), which may comprise multiple hardware or software modules, discussed hereinafter, contains computer executable instructions that cause the one or more microprocessors 111 to perform a variety of specific tasks, such as, for example, initiate a three-step blockchain-based identity verification protocol with the IAME 119, activate telematics within client device 101 and capture telematics data for storage on the IAME 119, monitor hacking, activate malware analysis, activate kill switches, and activate cyber threat quarantine procedures and cyber threat detection notifications.

Additionally, application 109 contains program instructions that cause the microprocessor 111 to perform a variety of on-blockchain specific tasks required to index and extract data contained in IAME 119 and to perform a variety of off-blockchain specific tasks to parse, extract, index and/or tag data contained in the one or more content service providers 125.

The program code modules are flexible, and may be configured to use a large variety of different business rules, such as, for example, identity rules, telematics rules, data recording rules, dashboard rules, hacking rules, malware rules, and kill switch rules. The purpose and function of each one of the program code modules in application 109 will now be described in more detail below.

Identity Verification Protocol

The identity verification module in application 109 contains instructions that when executed by the one or more microprocessors 111, cause the one or more microprocessors to perform a three-step identity verification process (illustrated in FIG. 4) to verify the vehicle operator (i.e., user). The identity verification module receives a verification request from a user via one or more of the user input devices. The user is the vehicle operator. The identity verification module obtains data from on the blockchain or off the blockchain and uses the identity business rules to process the data to verify the identity of the vehicle operator.

Upon completion of the three-step verification process, the identity verification module may generate a data recording trigger signal, activate telematics trigger signal, activate hacking monitoring trigger signal and activate malware analysis service trigger signal or the identity verification module may generate a primary kill switch trigger signal. If the vehicle operator is successfully verified, the identity verification module generates the data recording trigger signal, activate telematics trigger signal, activate hacking monitoring trigger signal and activate malware analysis service trigger signal and sends the trigger signals to data recording module, activate telematics module, hacking monitoring module and cyber malware analysis module respectively. Alternatively, if the vehicle operator is not successfully verified, the identity verification module will send the primary kill switch trigger signal to the kill switch module.

In another exemplary embodiment, the identity verification module in application 109 may send an engine startup trigger signal to the at least one client device 101 to turn on the vehicle when the vehicle operator is successfully verified or the identity verification module in application 109 may send an engine disable trigger signal to prevent the vehicle from being turned on when the vehicle operator is not successfully verified.

In another exemplary embodiment, the identity verification module may provide data to IAME 119 and initiate an identity verification request to IAME which causes a smart contract in the blockchain to perform the three step identity verification protocol, and the result of the verification process is provided to identity verification module in the user network device 107.

Moreover, the identity verification module will deactivate the IoT device 115 or the vehicle in response to receiving a kill switch (i.e., primary or secondary).

Data Recording Protocol

The recording module in application 109 contains instructions that when executed by the one or more microprocessors 111, cause the one or more microprocessors to initiate the recording of all event transactions occurring on the system 100 to the distributed ledger in IAME 119 and/or to one or more content service providers upon receipt of the data recording trigger signal. The data recording business rules are used to record the data on and off the blockchain. Examples of an event transaction may be the assignment of an employee's unique tag identification number (UTIN) (i.e., credentialing transaction), the assignment of a derived personal identification verification (PIV) credential (e.g., public key credential based off of public key infrastructure technology)(i.e., credentialing transaction), the collection of vehicle asset-level data (ALD)(e.g., vehicle make, model, year)(i.e., fleet-related transaction), or the collection of telematics data (e.g., vehicle speed, vehicle direction, etc.) (i.e., fleet-related transaction).

Dashboard Protocol

The dashboard module in application 109 contains instructions that when executed by the one or more microprocessors 111, cause the one or more microprocessors, upon receipt of a dashboard request, to collect data from on the blockchain and/or off the blockchain and to generate one or more dashboard display views, each illustrating key performance indicators and metrics for categories of information, such as, for example, asset management, vehicle operator identification management, operations management, vehicle diagnostics and analytics, risk management, motor pool management, and federal reporting. The dashboard business rules are used to generate the one or more dashboard display views.

Activate Telematics Protocol

The activate telematics module in application 109 contains instructions that when executed by the one or more microprocessors 111, cause the one or more microprocessors to activate the at least one telematics device 104 in the vehicle upon receipt of an activate telematics trigger signal. Once activated, the telematics device may provide telematics data to the user network device 107. The user network device may transmit the telematics data to IAME for storage in the blockchain (i.e., the distributed edger). The telematics business rules are used to activate the at least one telematics device and to collect telematics data from the at least one client device 101.

Moreover, the activate telematics module contains instructions that when executed by the one or more microprocessors 111, cause the one or more microprocessors to deactivate (i.e., turn off) the at least one telematics device 104 in response to receiving a secondary kill switch from the kill switch module in application 109.

Hacking Supervisor Protocol

The hacking supervisor module in application 109 contains instructions that when executed by the one or more microprocessors 111, cause the one or more microprocessors to continuously monitor diagnostic codes/data received from the at least one interface device 105, upon receipt of an activate hacking monitoring trigger signal. The hacking supervisor uses hacking business rules to process the diagnostic codes to determine whether a hack occurred to the vehicle's on-board system(s). Upon detecting that a hack occurred to the vehicle's on-board system(s), the hacking supervisor generates a hacking alert which may be provided to the vehicle operator via the display in the user network device 107 or via a display in the vehicle and/or vehicle ancillary platform. Thereafter, the vehicle operator may disconnect the user network device 107 and/or application 109 from the at least one interface device 105 or the vehicle operator may manually disconnect the vehicle's internet connection. For unmanned vehicles, the vehicle operator may send a remote internet kill signal to the vehicle to shut down the vehicle's internet connection.

Malware Analysis Protocol

The malware analysis module contains instructions that when executed by the one or more microprocessors 111, cause the one or more microprocessors to activate a malware platform to perform continuous malware analysis which is monitored by the malware analysis module for cyber-threats (i.e., cyber-attacks). The malware platform may be a third party malware analysis service integrated with application 109. The malware platform may be included in the user network device 107 and may be synced within or to each vehicle. Moreover, the malware platform could be embedded in a vehicle's infotainment system.

Upon completion of the cyber notification by the at least one cybersecurity unit 106, the vehicle operator will be prompted to access/activate the malware analysis service by logging into the service. The malware analysis module receives collected telematics data from the at least one client device 101 and provides the data to the malware analysis service for malware processing. The malware analysis module uses the malware business rules to evaluate the data received from the malware analysis service.

The malware analysis service is configured to identify a new cyber threat within a predetermined response time, such as, for example, less than five (5) minutes. Upon cyber threat detection, the malware analysis module determines which threat requires human intervention based on the malware business rules. Moreover, upon cyber threat detection, the malware analysis module automatically initiates and transmits a secondary kill switch trigger signal, along with a cyber-attack level, to kill switch module.

Kill Switch Protocol

The kill switch module contains instructions that when executed by the one or more microprocessors 111, cause the one or more microprocessors to process a primary kill switch upon receiving a primary kill switch trigger signal from the identity module in application 109 and to process a secondary kill switch upon receiving a secondary kill switch trigger signal from the malware analysis module in application 109. The kill switch module uses the kill switch business rules to process the primary kill switch and the secondary kill switch.

Cyber Threat Notification Protocol

The cyber threat notification module contains instructions that when executed by the one or more microprocessors 111, cause the one or more microprocessors to share the cyber threat with all predetermined partners/stakeholders via an existing trusted automated exchange.

Cyber Threat Quarantine Protocol

The cyber threat quarantine module contains instructions that when executed by the one or more microprocessors 111, cause the one or more microprocessors to initiate quarantine procedures to prevent spreading of the threat. Regardless of a cyber threat level, all anomalies within the network are put into a web-based quarantine location where infected files are no longer capable of infecting a host system. Once quarantined, infected executable files and libraries are scanned to identify any anomaly patterns over a predetermined timeframe, such as, for example, once a day for one week. All identified modifications of files or file structures are flagged and stored in a quarantine report to assist with preventing future anomalies.

In some exemplary embodiments, user network device 107 includes an encryption service. The encryption service can create and manage encryption keys or session ID's. In such embodiments, software implementing aspects of the blockchain based three-step identity verification process can make a call to the encryption service to encrypt the identity information received from a user. The service creates the keys, retains a private key, and provides both a public key and the encrypted identity information to the software that made the call to the service. The encryption service can be a web service. Moreover, user network device 107 may include cryptographic processes for user/vehicle operator authentication.

Further, in some exemplary embodiments, the user network device includes a smart card reader (e.g., PIV card reader).

The internet of things (IoT) device 115 may include a smart device 116 that operates on an Internet of Things (IoT) platform and an input/output interface. In a preferred embodiment, the smart device is an electronic display license plate device, such as, for example, the device described in U.S. Pat. No. 9,221,405, which is hereby incorporated by reference. The electronic display license plate ("e-tag") 116 replaces the current metal vehicle license plate, and utilizes a combination of motion sensors, position sensors, light sensor(s), light sensor switch(es) and other components to provide for safer and more efficient use of vehicles.

Figure 2:
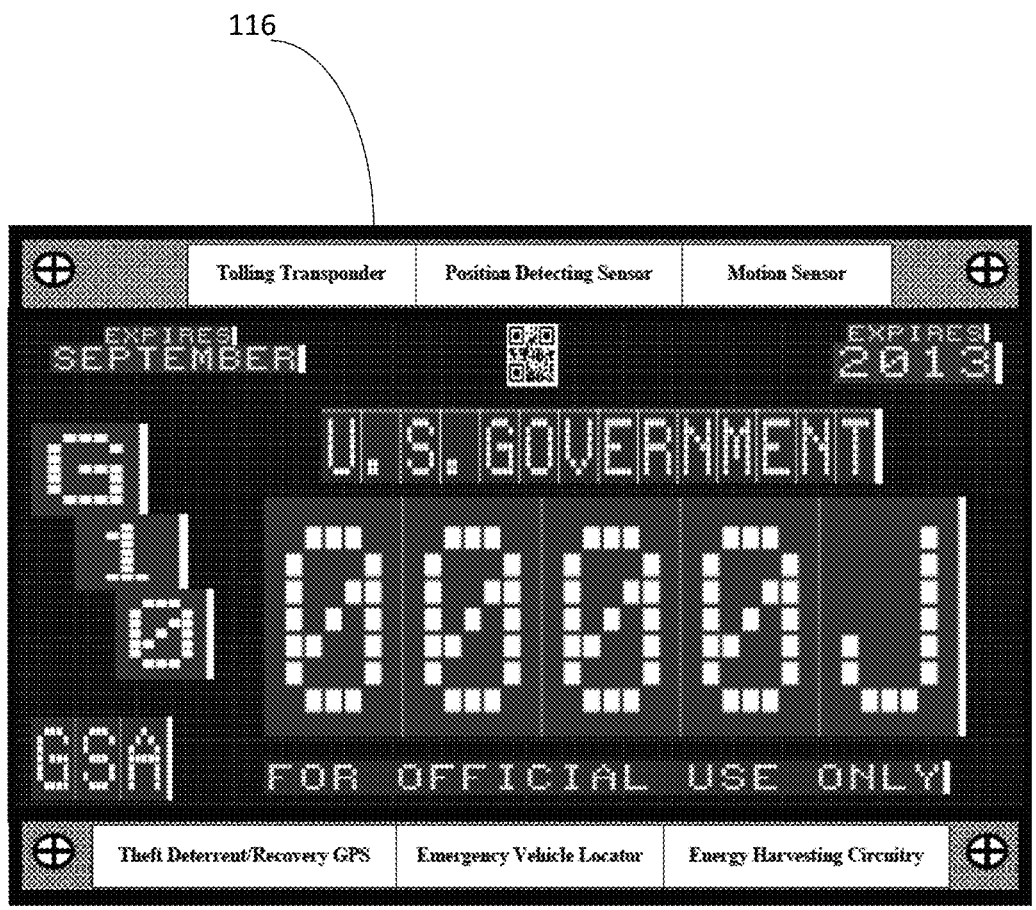
FIG. 2 shows an exemplary view of an electronic digital license plate device according to an embodiment of the present disclosure.

Shown in FIG. 2 is an exemplary illustration of an e-tag 116. The e-tag includes a display panel which is illuminated when the e-tag is activated. Moreover, the display panel will also display predetermined information when the e-tag is activated. The e-tag is activated when the IoT device 115 receives an activate signal from user network device 107 or IAME 119. The activate signal causes the predetermined information to be displayed on the display panel and the signal causes the light sensor switch(es) to toggle the light sensor(s) to an on position, thereby illuminated the display panel.

The display panel of the e-tag is only activated once the identity of the operator of the vehicle has been verified as an authorized user of the vehicle. This verification process may be performed by user network device 107 and/or IAME 119. Upon completion of the verification process, the user network device 107 will send the activate signal to the IoT device 115. On the contrary, if the operator of the vehicle is determined not to be an authorized user of the vehicle, the user network device 107 (i.e., the identity module in application 109) will generate and transmit a primary kill switch signal to the IoT device, which will prevent the e-tag from being activated. In a default state, which occurs when the vehicle engine is off, the e-tag is deactivated (i.e., the display is not illuminated). Moreover, when the IoT device 115 receives a secondary kill switch from the user network device 107 (i.e., kill switch module in application 109), the IoT device deactivates the IoT by, for example, deactivating (i.e., turn off) the electronic display license plate.

The electronic display license plate 116 includes a display panel which may be implemented by a variety of technologies, such as, for example, an array of light-emitting diodes (LEDs), an electronic paper (e-paper) display, an electroluminescent panel, or preferably, a liquid crystal display (LCD) panel. The display panel is controlled by electronic circuitry which is connected to the display panel through a wiring harness. The electronic circuitry includes a memory circuit for storing information to be displayed on the electronic display license plate 116, such as, for example, the license number, the state, county, year and month of expiration, etc.

In another alternative embodiment, the IAME 119 stores the information to be displayed on the electronic display license plate 116 in a distributed ledger (i.e., blockchain).

The network engine 118 may include any one of or a combination of multiple different types of networks, such as, cable networks, the Internet, wireless networks, and other private and/or public networks. In some instances, the network engine 118 may include cellular, Wi-Fi, or Wi-Fi direct. The network engine 118 may comprise any combination of local area and/or wide area networks, using both wired and wireless communication systems.

The Identity and Access Management Enterprise ("IAME") 119 includes a blockchain as a service (BaaS) platform. The platform includes a peer-to-peer blockchain network including a distributed ledger (i.e., a blockchain). The distributed ledger is managed by the peer-to-peer blockchain network using Ethereum software. In an exemplary embodiment, the peer-to-peer blockchain network is configured as a permissioned Ethereum platform ("Ethereum blockchain"). The Ethereum peer-to-peer blockchain network includes a plurality of peer nodes, and each node includes an application programming interface (API), a ledger and an Ethereum virtual machine (EVM).

The distributed ledger includes an authorized users database and a fleet registration database. Every organization that manages a fleet of vehicles using the systems and methods disclosed herein, maintains a database including a list of its fleet vehicles and corresponding authorized vehicle operators, such as, for example, an authorized users database. The contents of which may include the vehicle operator identification management data used for identifying, credentialling and compliance. The authorized user database may include Physical and Logical Access Module, Automated HSPD-12 Credential Database Interface, Department of Motor Vehicles (DMV) Interface, Department of Transportation (DoT) Interface, Driver's Insurance Compliance Interface, and Remote Identification of Unmanned Aircraft Systems interface.

Moreover, the authorized user database needs to be populated with information on or off blockchain which may include:

i. Authorized Operator's Names
    ii. Authorized Operator's Employer's Name
    iii. Authorized Operator's Agency and Logo
    iv. Authorized Operator's Driver's License Information
    v. Authorized Operator's Driver's Insurance Information
    vi. Biometrics to authenticate, such as, fingerprints, facial images, etc.
    vii. Digital versions of Personal Identity Verification (PIV), Common Access Card (CAC), or Driver's License credentials
    viii. Credentials expiration month/year (Driver's License/PIV/CAC)
    ix. Unique Tag Identification Numbers (UTINs) linking to PIV/CAC/Driver's License
    x. Derived unique identifiers such as a serial number, registration number, or session ID
    xi. Expiration month/year of credentials per the PIV/CAC/Driver's License
    xii. Employer/Government agency linking to specified employee authorized operators xiii. DMV/DOT/Insurance information linking to specified authorized operators xiv. Alternate identifiers replacing PII as necessary Further, each organization maintains a fleet registration-telematics database which may include fleet registration data, such as, for example, Vehicle Acquisitions (includes E-Plates as installed by dealer or vendor), Vehicle Disposals (transfer of E-Plate to new vehicle), Federal/Military Levels—UNICOR License Plate Store Interface, Federal Motor Vehicle Registration System (FMVRS) Interface, Department of Transportation (DoT) Interface, State Level—Department of Motor Vehicles (DMV) Interface, Driver's License Interface, Insurance Interface and Law Enforcement Interface (e.g., National Law Enforcement Telecommunications System (NLETS))

The fleet registration-telematics database needs to be populated with information on or off blockchain which may include:

i. Vehicle asset-level data (ALD)—(e.g., vehicle make, model, year)

ii. Vehicle Identification Number (VIN)

iii. Manufacturer's serial numbers iv. VIN/serial numbers and E-Tag Linkage (E-License Plates represent standard inventory control for IT products (i.e., VINs/serial number links to ownership of vehicles, not license plates). E-License Plate numbers are vehicle authorized operator-based, thus they dynamically will change with each vehicle operational use.

Moreover, the fleet registration-telematics database may include telematics data, such as, for example, Operations Management—Telematics/GPS/Magnetometer Tracking data (i.e., speed, tracking (geofencing) statistics, idling times, utilization rates, and mileage), Vehicle Diagnostics and Analytics—Telematics/Vehicle Diagnostics data (i.e., engine diagnostic, fuel usage reports, and maintenance reports), Risk Management—Telematics/Safety Management (Drivers & Vehicles), Roadside Assistance [First Responder Network Authority (FirstNet)] (i.e., data linking to authorized operators), and Collision Notification data linking to authorized operators.

The application programming interface (API)(e.g., web3 API) interfaces with off-blockchain third-parties (e.g., applications, user devices, client devices, servers, etc.). The API allows third-parties to interface with the Ethereum blockchain. The ledger is a database encompassing a physical chain (i.e., a doubly linked list) of fixed-length blocks that each include a list of transactions (e.g., read data, write data, deploy contract, call contract, etc.) that occur on the Ethereum blockchain. Each peer node in the network has a duplicate copy of the ledger.

The Ethereum Virtual Machine (EVM) is a virtual state machine that functions as a runtime environment for smart contracts in Ethereum. Smart contract code that executes in the EVM is isolated from the network, filesystem, and other processes of Ethereum. Every node in the Ethereum network runs an EVM instance which allows them to agree on executing the same instructions.

As noted, the Ethereum blockchain is managed by the peer-to-peer network, which collectively adheres to a protocol for inter-node communication and validating new blocks. Once recorded, the data in any given block cannot be altered retroactively without alteration of all subsequent blocks, which requires consensus of the network majority. The blockchain platform uses private blockchains. The private blockchains (i.e., permissioned blockchain) can be downloaded only by specific individuals, say, managers within a particular agency.

The blockchain provides a vault of trusted data that exhaustively validates each employee's/driver identity, allows employees/drivers to activate fleet vehicles or privately-owned vehicles, and tracks vehicle asset-level data (ALD), and/or telematics data. The digital license blockchain plate model allows drivers, Department of Motor Vehicles (DMV) agencies, Department of Transportation (DoT) agencies, Federal agencies, fleet managers, etc. to use/pay for particular software-based services (i.e., software-as-a-service or SaaS) that best meet their particular credentialing and fleet-related needs.

The digital license plate/telematics platform may be built on the Ethereum blockchain platform. The source of all blockchain data is from hosted nodes which are individual systems within the blockchain network. Each node is synchronized with government networks and all processes run in a secure and controlled environment. The digital license plate/telematics blockchain incorporates subscription services for blockchain ledger data to support its digital assets.

The subscription services include full blockchain ledgers since inception (genesis block) to present; thus creating an immutable record of each credentialing/fleet-related transactional event from the day of hire until the day an employee leaves Federal service. The data controls and exchanges will be executed through smart contracts posted to the blockchain. Smart contract code may manage the transfer of digital license plate devices from vehicle to vehicle.

The blockchain uses a Proof of Authority/Proof of Identity Consensus Model for publishing (i.e., recording) data in the blockchain. This model relies on the trust of publishing nodes through their known link to real world identities (i.e., identities proven/verified within blockchain network). For instance, an agency could have scores of employees who can submit data to the blockchain. However, it might appoint five Trustees who have authority to publish new blocks to the chain. These same people would have to reach consensus that a block is properly formed/valid before publishing it to the chain. According to the blockchain rules, consensus might require 100% agreement to publish new blocks, or it might require only a quorum (this platform initially requires three of the five trustees).

The at least one content service provider 125 may include at least one or more federal network enterprise, statewide network enterprises, or a general fleet management enterprise. Each enterprise may include one or more microprocessors, one or more memory devices (e.g., random access memory (RAM), non-volatile secondary storage, hard drive, a floppy drive, and a CD-ROM drive), and network interfaces (e.g., a wired or wireless Ethernet card and a digital and/or analog input/output card) and one or more databases. The content service provider stores content for a fleet management entity (i.e., authorized issuing entity of unique identifiers), such as, for example, a government agency (e.g., Homeland Security or Department of Defense (DoD)), or a statewide vehicle regulation office, such as, for example, the Department of Motor Vehicle. The content service provider may store any data needed by the system 100 to provide cyber defense for electronic identification, vehicles, vehicle ancillary platforms, and telematics platforms, such as, for example, vehicle operator identity data/attributes (e.g., UTIN, fingerprints, facial blueprints, etc.).

FIGS. 3-4, 5A and 5B show exemplary flow diagrams (i.e., 300, 400 and 500) illustrating, by way of example, the steps performed in application 109 of system 100 that may be implemented in accordance with certain embodiments of the present disclosure. The exemplary flow diagrams illustrate a sequence of operations that can be implemented in hardware, software, or a combination thereof. In the context of software, the operations represent computer-executable instructions stored on one or more non-transitory computer-readable media that when executed by one or more processors, perform the recited operations. Generally, computer-executable instructions include routines, programs, objects, components, data structures, and the like that perform particular functions or implement particular abstract data types.

The order in which the operations are described is not intended to be construed as a limitation, and any number of the described operations may be carried out in a different order, omitted, combined in any order, and/or carried out in parallel. Some or all of the operations described in the exemplary flow diagrams may be carried out by using an application (e.g., application 109) stored in the one or more memory devices 113 and executed by the one or more processors 111 of the user network device 107 in the system 100.

The steps may be implemented via a computer software program comprising a plurality of related functional modules each having program instructions for execution by the one or more microprocessors 111 of FIG. 1, or it may be implemented by any other suitable machine or device without departing from the scope of the present disclosure.

Figure 3:
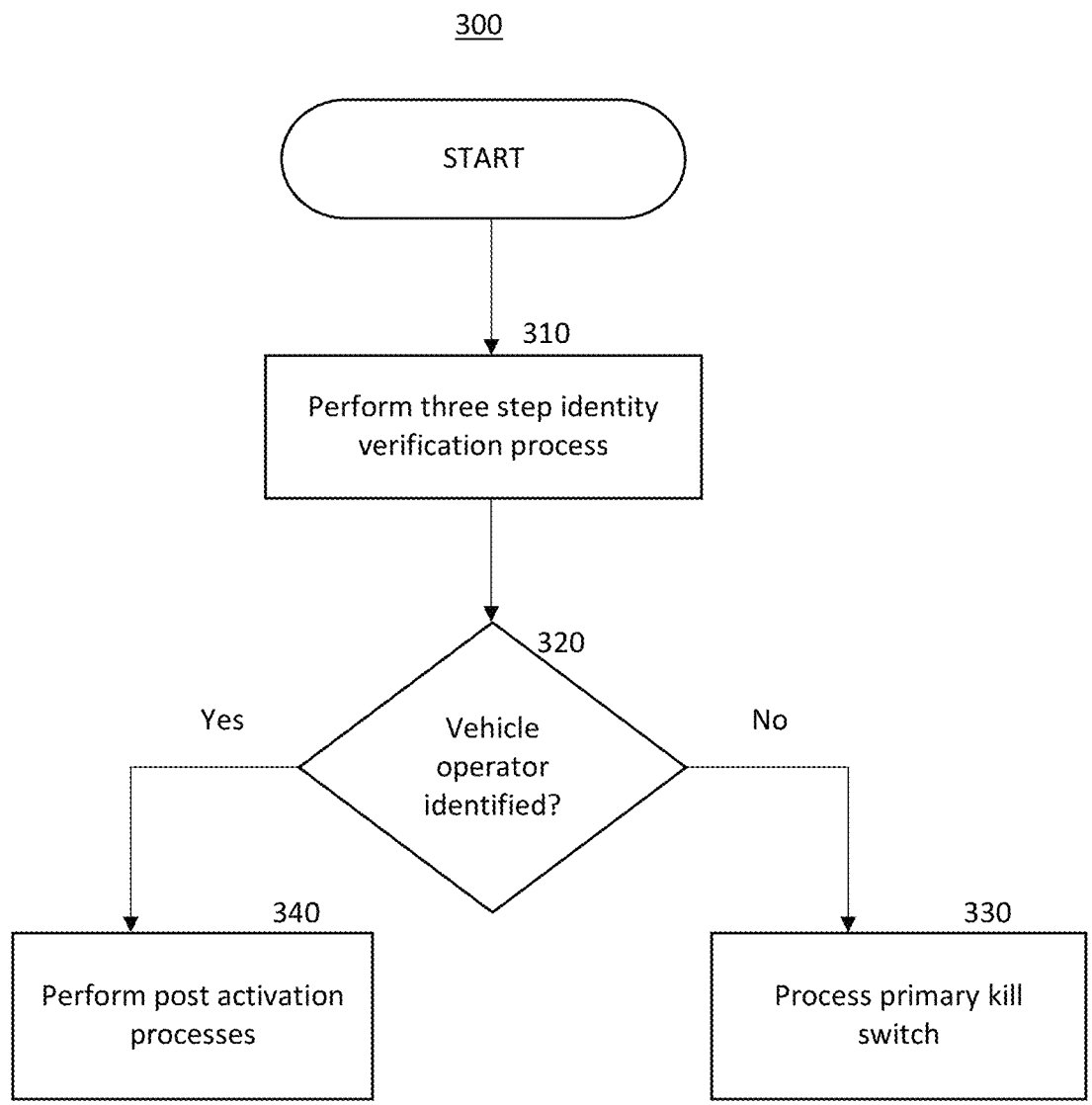
FIG. 3 shows an exemplary high level flow diagram of a method for providing cyber defense for electronic identification, vehicles, ancillary vehicle platforms and telematics platforms according to an embodiment of the present disclosure.
Figure 4:
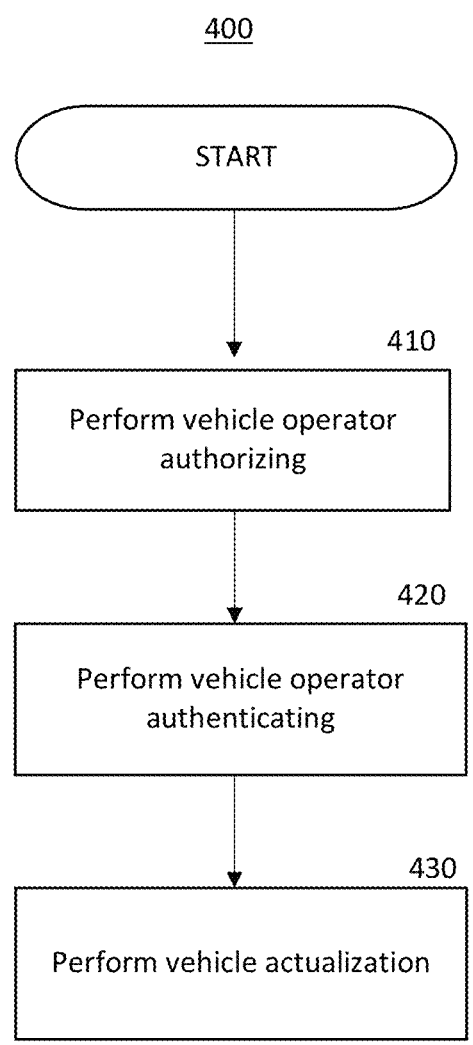
FIG. 4 shows an exemplary flow diagram of a method for performing a three-step identity protocol according to an embodiment of the present disclosure.

FIG. 3 shows an exemplary high level flow diagram 300 of a method for providing cyber defense for electronic identification, vehicles, ancillary vehicle platforms and telematics platforms according to an embodiment of the present disclosure. The process starts at step 310 where the system 100 carries out the three-step identity verification process, the steps for which are illustrated in FIG. 4. The results of the three-step identity verification process is processed at step 320. At step 330, if the vehicle operator was not verified successfully, the system 100 processes a primary kill switch (via kill switch module in application 109). At step 340, if the vehicle operator was verified successfully, the system performs post vehicle activation processing, the steps for which are described in FIG. 5.

FIG. 4 shows an exemplary flow diagram of the method for performing the three-step identity verification process (i.e., the identity verification protocol) according to an embodiment of the present disclosure. Turning to FIG. 4, the steps performed to carry out the identity verification protocol are illustrated.

The identity verification protocol may be performed using on-blockchain processes, off-blockchain processes or a combination thereof. An on-blockchain process is performed on the blockchain platform. An off-block chain process is performed outside of the blockchain platform. The system 100 may integrate an on-blockchain platform and processes with an off-block platform and processes.

The identity verification protocol starts at step 410 with an authorizing step where an authorized user (i.e., vehicle operator) of a vehicle (e.g., a fleet vehicle owned by an authorized issuing entity of the unique identifier) is assigned a unique credential, serial number, or registration. Moreover, a unique session ID may be assigned to a vehicle operator with remote identification broadcast and transmit capabilities. The unique credential may include, for example, a Unique Tag Identification Number ("UTIN") which may be assigned/issued by an authorized issuing entity.

The authorized issuing entity may include, for example, a government agency where the user/vehicle operator is an employee, such as, for example, Homeland Security or Department of Defense (DoD), or a statewide vehicle regulation office, such as, for example, the Department of Motor Vehicle. The UTIN may be assigned by an employer by means of a Personal Identity Verification (PIV) card or a Common Access Card (CAC). Moreover, the UTIN may be assigned by the statewide vehicle regulation office by way of a driver's license, where the tag number is the UTIN.

The unique credential (i.e., UTIN) assigned to the user may remain the same for the duration of the employee's service or for the duration of any driver's privilege to operate a vehicle per DMV/DOT regulations, regardless of changes in government agency, tour of duty, or driving other vehicles with e-license plates in the DMV sector. Each assigned UTIN is encrypted and tokenized and automatically distributed across multiple peer computing devices in IAME 119.

Moreover, the authorized issuing entity may also assign role-based parameters with each UTIN to designate access permissions for the corresponding user/vehicle operator. The permissions indicate what data and/or applications the corresponding user is allowed to access on the authorized issuing entity's platform (i.e., content service provider 125). Therefore, each user can only see what they are allowed to see and nothing more. Moreover, software-defined parameters may be defined using the user's UTIN for personal telematics. The role-based parameters are stored with the UTIN in IAME 119. The UTIN and role-based parameters are encrypted and tokenized and automatically distributed across multiple peer computing devices in the IAME 119.

When a user wants to operate the vehicle, the user first has to initiate an authorization. The authorization ensures that the user has been assigned a UTIN by the authorized issuing entity which is an indication that the user has authorization from the authorized issuing entity to operate a company vehicle. The authorization step may be initiated via application 109 on user network device 107, using, for example, a PIV, CAC, or DMV/DOT Driver's License credential. The user's assigned unique credential on the PIV card, CAC or driver's license is verified with corresponding unique credential information stored in the IAME 119. In operation, the user/vehicle operator may download application 109 to a computing processing device, such as, for example, user network device 107.

Upon launch of application 109, the user's unique credential is provided to the application 109. The user's unique credential may be provided by way of reading a PIV smart card or a CAC access card or by scanning a driver's license credential. The user's unique credential (i.e., UTIN) may include a Cardholder Unique Identifier (CHUID), such as, for example, a digitally signed Federal Agency Smart Card Number (FASC-N) and card authentication information, such as, for example, a certificate and key pair which may be used to verify that the unique credential was issued by an authorized issuing entity, has not expired, and has not been revoked. The application 109, via the user network device 107, may authorize the user by querying the distributed ledger in IAME 119 for the CHUID and retrieving the card authentication information to verify that the unique credential was issued by an authorized issuing entity, has not expired, and has not been revoked. Once authorization is complete, application 109 performs user authentication at step 520.

If the IAME 119 does not include a record for the user/vehicle operator (i.e., the query result is null), then the user network device 107 may attempt to verify the registration information off the blockchain with content service provider 125. The content service provider maintains a record of the UTIN assigned to an user (i.e., employee). The user network device 107 may initiate a transaction with content service provider 125 to process a query transaction to retrieve information (i.e., UTIN) corresponding to the user/vehicle operator (i.e., username) to verify the registration information.

Once the information is verified as accurate, the user network device 109 may initiate a transaction with the IAME 119 to record the UTIN for the user/vehicle operator in the distributed ledger in IAME 119. If the verification results indicate that the information is not accurate (i.e., incorrect/unverifiable), the application 109 prevents the user from registering an account, since as noted, a user should be assigned a UTIN from an authorized issuing entity, such as, for example, content service provider, before the user is allowed to register an account.

Upon launch of application 109 for the first time, the user/vehicle operator is required to create a user network device based (e.g., a mobile-based) credential for future authentication of the user after the authorization step is completed successfully. The user network device based credential may include one or more attributes for authentication, such as, for example, a password, a fingerprint, a facial blueprint, etc. The one or more attributes are stored on the blockchain in the distributed ledger in IAME 119 for subsequent verification. Moreover, the one or more attributes may be stored off the blockchain in content service provider 125.

The authenticating step (i.e., step 420) may include a multi-factor authentication step including biometric or cryptographic processes that validates a user's identity. The authentication steps may be performed using the blockchain (i.e., distributed ledger) in IAME 119. The biometric or cryptographic processes may include, for example, password authentication, fingerprint authentication, facial authentication, security token authentication and mobile phone authentication. The multi-factor authentication process shall include at least two or more of the biometric or cryptographic processes.

The user/vehicle operator will be prompted to input one or more attributes of the user's user network device based credential for verification with the corresponding one or more attributes stored in IAME 119 or content service provider 125. If the one or more attributes inputted to user network device 107 match the one or more attributes stored in IAME 119 or content service provider, the user/vehicle operator authentication process was successful. Alternatively, it the one or more attributes inputted to user network device 107 do not match the one or more attributes stored in IAME 119 or content service provider 125, then the user/vehicle operator authentication process was not successful and the identity verification module will send a primary kill switch trigger signal to the kill switch module in application 109.

In performing the multi-factor authentication step, the system 100 may cross-reference to any federal agency/office or state DMV established identity architectures/cyber-defense networks, such as, for example, the Defense Information Systems Agency (DISA) zero-trust network, the Department of Homeland Security (DHS) Office of Biometric Identity Management (OBIM) network, behavioral-based identity networks, alternate identifier networks replacing personally identifiable information (PII), cyber intruder monitoring/methods/analysis networks, or any other existing/future identity architectures/cyber-defense networks or the like.

Once the authentication step 420 is completed successfully, application 109 performs vehicle actualization at step 430. The vehicle actualization step enables a human-to-vehicle translation by initiating the software in the vehicle that enables an authenticated driver to start and drive the vehicle. Moreover, the application 109 obtains and verifies the unique tag identification number (UTIN) of the vehicle operator, which is unique to each individual vehicle operator. Then, application 109 activates IoT device 115 if the vehicle is an automobile, and for all other vehicles, the actualization step turns the vehicle on. Thereafter, the identity verification module generates a data recording trigger signal, activate telematics trigger signal, activate hacking monitoring trigger signal and activate malware analysis service trigger signal.

Alternatively, if authentication step 420 is completed unsuccessfully, the identity verification module sends a primary kill switch trigger signal to the kill switch module.

Figure 5A:
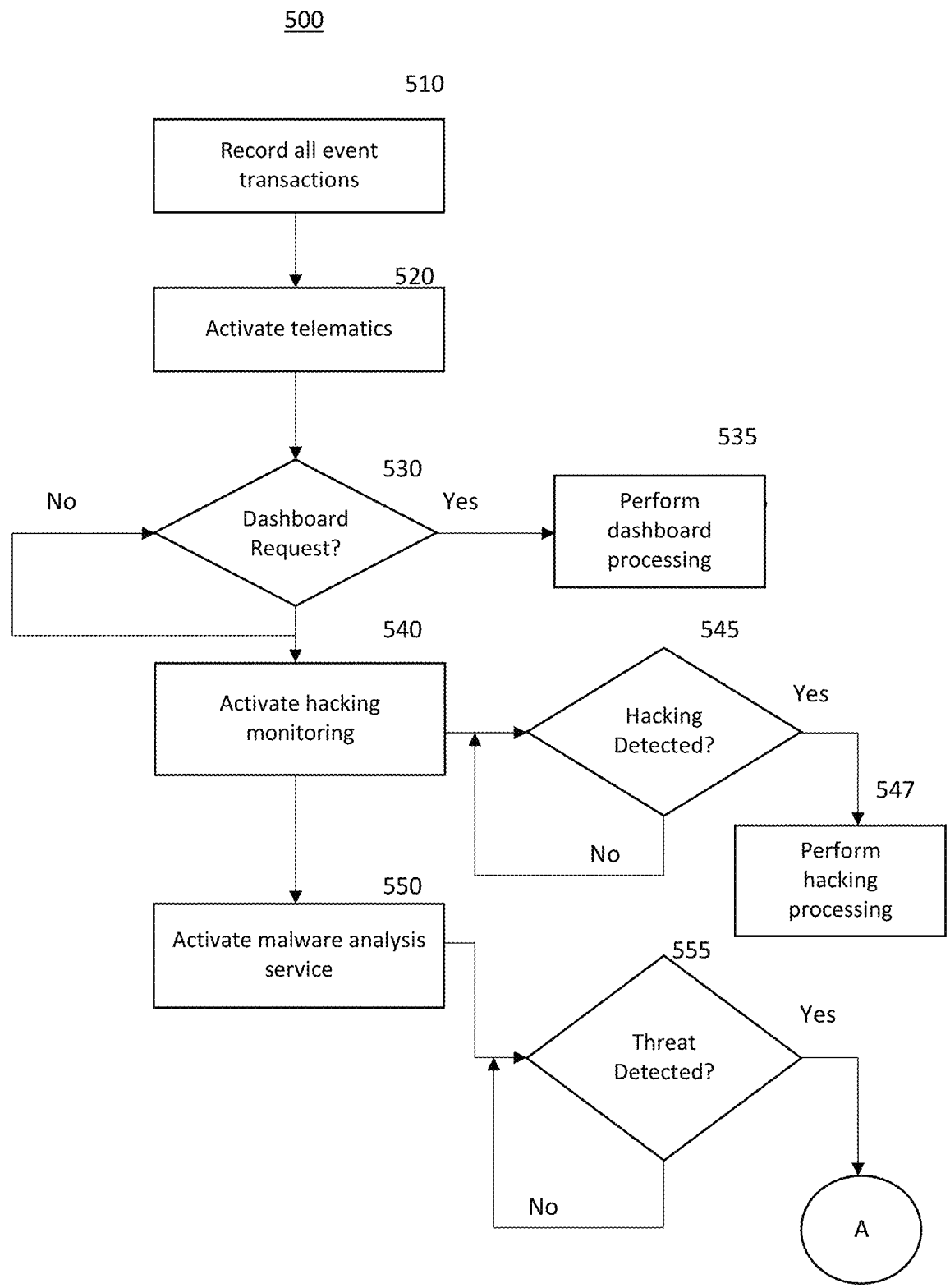
FIGS. 5A-5B show an exemplary flow diagram of the steps performed after vehicle actualization.
Figure 5B:
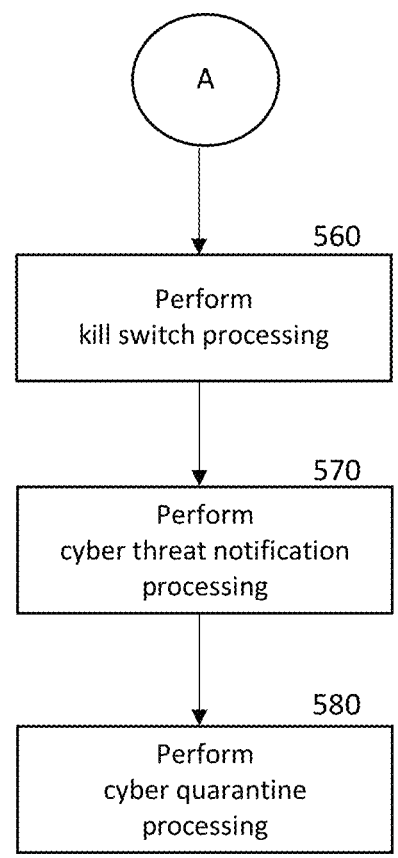

Turning to FIGS. 5A and 5b, the processes performed after vehicle actualization are illustrated. At step 510, upon completion of the actualization step 430, application 109 initiates a recording module to record all event transactions (i.e., credentialing transactions and fleet-related transactions) that occur on the system 100 to the distributed ledger in IAME 119, upon receipt of the data recording trigger signal from the identity verification module.

The recording module provides secure and encrypted data feeds via a one-time data transfer to IAME 119 for on-blockchain recording and/or via an additional application programming interface (API) transmission option for off-blockchain recording. The data feeds may include daily updates and historical information. Each transaction may contain data stored in a particular format that is standardized across disparate data sources to facilitate data feeds for viewing and consumption. Individual transactions are bundled together into a block. Each block is then submitted to IAME 119 which begins working to add the new block to the distributed ledger.

Further, at step 520, upon completion of the actualization step 430, application 109 activates the at least one telematics device 104 upon receipt of the activate telematics trigger signal from the identity verification module. As noted above, each vehicle includes at least one telematics device 104, which upon activation, extracts/collects fleet management data. The extracted/collected data is recorded in the distributed ledger in IAME 119 via recording module in application 109. Moreover, the extracted/collected data is sent to the cyber malware analysis service for processing.

At step 530, application 109 determines if a dashboard request has been received. A dashboard request may be received from the one or more user input devices in user network 107. If a dashboard request has been received, dashboard module in application 109 performs dashboard processing, at step 535, which includes collecting data from on the blockchain and/or off the blockchain and generating one or more dashboard display views for categories of information, such as, for example, asset management, vehicle operator identification management, operations management, vehicle diagnostics and analytics, risk management, motor pool management, and federal reporting. If no dashboard request has been received, the application 109 continues to monitor whether a dashboard request has been received.

At step 540, application 109, activates hacking monitoring upon receipt of the activate hacking monitoring trigger signal from the identity verification module. The hacking supervisor module continuously monitor diagnostic codes/ data received from the at least one interface device 105 to determine whether a hack occurred to the vehicle's on-board system(s). The hacking supervisor module may determine that a hack occurred to a vehicle's on-board system by analyzing the diagnostic codes.

So, for example, a vehicle's on-board system(s) may provide a diagnostic code relating to the status of a built-in vehicle wireless modem. If the status code indicates an abnormality, then the hacking supervisor module interprets the abnormality status for the built-in vehicle wireless modem as a hack. Moreover, the diagnostic code may include, for example, a ECU/CAN status code, which provides an indication as to whether application 109 in the user network device 107 is connected to and synced with the at least one interface device 105. If the status code indicates an abnormality, then the hacking supervisor module interprets the abnormality status for the ECU/CAN as a hack.

If a hack is detected at step 545, the hacking supervisor module, performs hacking processing at step 547, which includes generating a hacking alert which may be provided to the vehicle operator via the display in the user network device 107 or via a display in the vehicle and/or vehicle ancillary platform. Thereafter, the vehicle operator may disconnect the user network device 107 and/or application 109 from the at least one interface device 105 or the vehicle operator may manually disconnect the vehicle's internet connection. For unmanned vehicles, the vehicle operator may send a remote internet kill signal to the vehicle to shut down the vehicle's internet connection.

At step 550, application 109, activates the malware analysis service upon receipt of the activate malware analysis service trigger signal. The malware analysis module activates the malware platform (i.e., the malware analysis service), which receives telematics data collected from at least one client device 101. The data is processed and analysis data is provided to the malware analysis module for evaluation. The malware analysis service may identify a new cyber threat (i.e., cyber-attack) within a predetermined response time and report the threat to the malware analysis module. If a threat has been detected at step 555, the malware analysis module determines a cyber-attack level for the detected threat, and processing proceeds to step 560. So, for example, a cyber-attack level 0 may indicate no human intervention is needed, and a cyber-attack level 1 may indicate that human intervention is needed. The system may include predetermined guidelines for determining when human intervention is required. For example, the predetermined guidelines may include cyber-attacks that can lead to massive seizure of vehicles with subsequent casualties, loss of life, property damage, and compromised national security.

Moreover, upon detection of a cyber threat cyber threat detection, the malware analysis module automatically initiates and transmits a secondary kill switch trigger signal, along with a cyber-attack level, to kill switch module.

At step 560, kill switch processing is performed by kill switch module, upon receipt of a primary kill switch trigger signal or a secondary kill switch trigger signal. For ground-based vehicles, and specifically, for automobiles, primary kill switch processing causes the activation/deactivation of IoT device 109. For all other manned or unmanned vehicles, primary kill switch processing prevents operation of the vehicle. Processing of the secondary kill switch may include any one or more of the following: kill the vehicle internet connection, deactivate the IoT device 115, force shutdown or landing of the vehicle based on the severity of the cyber-attack, which is determined by the cyber-attack level transmitted to the kill switch module from the malware analysis module. For ground-based vehicles (i.e., manned and unmanned), the secondary kill switch processing may include an engine shutdown trigger, which causes the ground-based vehicle's engine to shut down. For airborne-based vehicles, the secondary kill switch processing may include a forced landing trigger, which forces the airborne-based vehicle to land. For sea-based vehicles, the secondary kill switch processing may include an engine shutdown trigger, which causes the sea-based vehicle's engine to shut down.

At step 570, cyber threat notification processing is performed by cyber threat notification module. At step 580, cyber quarantine processing is performed by cyber threat quarantine module.

As noted above, the order of processing of the steps illustrated in the flow diagrams FIGS. 3-4, 5A and 5B may be carried out in a different order, omitted, combined in any order, and/or carried out in parallel. In a preferred exemplary embodiment, steps 510, 520, 530, 540 and 550 of flow diagram 500 are performed in parallel.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Any memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CD ROM) (optical).

The terms "module' and "component as used herein generally represent Software, firmware, hardware, or combinations thereof. In the case of a software implementation, the module or component represents program code that performs specified tasks when executed on a processor. The program code may be stored in one or more computer readable memory devices.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). The term computer-readable storage media does not include signals and carrier waves. In addition, the term computer-readable storage media does not include communication connections.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. A computer implemented method of providing cyber defense for electronic identification, vehicles, ancillary vehicle platforms, and telematics platforms, the method comprising the steps of:
    determining whether a user is an authorized operator of a vehicle;
    activating a primary kill switch if the user is determined to be an unauthorized operator of the vehicle, wherein the primary kill switch prevents activation of the vehicle's digital license tag or prevents activation of the vehicle;
    activating the vehicle or the vehicle's digital license tag and activating cyber security monitoring if the user is determined to be an authorized operator for the vehicle;
    activating vehicle telematics, asset management, and motor pool management if no cyber-attack is detected by the cyber security monitoring;
    continuously performing cyber security monitoring as long as the vehicle is in an active state; and
    activating a secondary kill switch if the cyber security monitoring detects a cyber-attack, and activating cyber threat quarantine procedures and cyber threat detection notifications after activation of the secondary kill switch.

2. The method of claim 1, further comprising the step of extracting data corresponding to the activated telematics, asset management, and motor pool management from a blockchain network for display on a first dashboard.

3. The method of claim 1, further comprising the step of displaying data corresponding to the cyber security monitoring on a second dashboard.

4. The method of claim 1, wherein the step of determining whether a user is an authorized operator of the vehicle includes performing an identity verification protocol.

5. The method of claim 4, wherein the identity verification protocol includes authorizing the user, authenticating the user and actualizing the digital license tag.

6. The method of claim 5, wherein authorizing the user includes assigning a unique identifier, serial number, registration number, or session ID to the user with remote identification broadcast and transmit capabilities.

7. The method of claim 5, wherein authenticating the user includes performing at least two or more processes from the group comprising password authentication, fingerprint authentication, facial authentication, security token authentication and mobile device authentication.

8. The method of claim 5, wherein actualizing the digital license tag includes triggering the activation of an external display of the digital license tag when the user is determined to be an authorized operator of the vehicle and triggering the primary kill switch when the user is determined to be an unauthorized operator of the vehicle.

9. The method of claim 1, wherein the activated vehicle telematics allow tracking of the vehicle.

10. The method of claim 1, wherein the vehicle telematics provides data for one or more metrics from the group comprising of, but not limited to: i) vehicle speed, ii) vehicle position with a Coordinated Universal Time (UTC), global positioning system (GPS) or magnetic sensor (magnetometer) time mark, iii) vehicle direction, iv) vehicle altitude and vehicle operator control station location regarding autonomous vehicles, air-based vehicles, roadable aircraft vehicles, and unmanned aerial vehicles (UAV).

11. The method of claim 4, wherein on-blockchain processes are used to perform the identity verification protocol.

12. The method of claim 4, wherein on-blockchain processes and off-block processes are used to performing an identity verification protocol.

13. The method of claim 1, wherein a cyber-attack is detected upon hacking detection of the vehicle's on-board systems.

14. A system for providing cyber defense for electronic identification, vehicles, ancillary vehicle platforms, and telematics platforms, the system comprising: at least one mobile device comprising:
    a client interface unit for interfacing with at least one client device including a vehicle engine control unit (ECU);
    an on-board diagnostics (OBD II) port;
    a telematics control unit (TCU);
    a cybersecurity unit;
    an Internet of things (IoT) interface unit for interfacing with at least one IoT device including a digital license tag which is associated with a vehicle;
    at least one processor;
    at least one memory for storing executable instructions, the at least one processor configured to execute the instructions to:
        generate blockchain transactions to send to a user identity platform enterprise to retrieve user information relating to the vehicle;
        determine whether a user is an authorized operator of the vehicle using the retrieved user information;
        activating a primary kill switch if the user is determined to be an unauthorized operator of the vehicle, wherein the primary kill switch prevents the activation of the vehicle or of the digital license tag associated with the vehicle;
        activating the vehicle or the digital license tag associated with the vehicle and activating cyber security monitoring if the user is determined to be an authorized operator of the vehicle;

activating vehicle telematics, asset management, and motor pool management if no cyber-attack is detected by the cyber security monitoring;

continuously performing cyber security monitoring as long as the vehicle is in an active state;

activating a secondary kill switch if the cyber security monitoring detects a cyber-attack; and activating cyber threat quarantine procedures and cyber threat detection notifications after the secondary kill switch disables operation of the vehicle a network engine;

an Identity and Access Management Enterprise ("IAME") comprising:

a memory for storing executable instructions;

a distributed network of peer to peer computing devices, wherein each computing device includes a decentralized ledger for storing transactions and smart contracts, and at least one hardware microprocessor configured to execute the executable instructions to:

process the generated blockchain transactions received from the at least one mobile device;

query the decentralized ledger to retrieve user information; and transmit the user information to the at least one mobile device; and at least one content service provider comprising:

a memory for storing executable instructions and at least one database, wherein the at least one database stores off block-chain generated or retrievable data.

15. The system of claim 14, wherein the determination of whether a user is an authorized operator of the vehicle includes performing an identity verification protocol.

16. The system of claim 14, wherein the identity verification protocol includes authorizing the user, authenticating the user and actualizing the digital license tag.

17. The system of claim 16, wherein authorizing the user includes assigning a unique identifier, serial number, registration number, or session ID to the user with remote identification broadcast and transmit capabilities.

18. The system of claim 16, wherein authenticating the user includes performing at least two or more processes from the group comprising password authentication, fingerprint authentication, facial authentication, security token authentication and mobile device authentication.

19. The system of claim 16, wherein actualizing the digital license tag includes triggering the activation of an external display of the digital license tag when the user is determined to be an authorized operator of the vehicle and triggering the primary kill switch when the user is determined to be an unauthorized operator of the vehicle.

20. The system of claim 14, wherein cyber defense for electronic identification, vehicles, ancillary vehicle platforms, and telematics platforms using a blockchain is integrated at the time of manufacturing or aftermarket.

* * * * *